United States Patent [19]

Waters

[11] 4,041,007
[45] Aug. 9, 1977

[54] EPOXY COMPOSITION AND ARTICLE OF MANUFACTURE THEREOF

[75] Inventor: William D. Waters, Tulsa, Okla.

[73] Assignee: Youngstown Sheet and Tube Company, Youngstown, Ohio

[21] Appl. No.: 664,092

[22] Filed: Mar. 5, 1976

[51] Int. Cl.² .............................................. C08L 63/00
[52] U.S. Cl. ............................ 260/37 EP; 260/47 EN
[58] Field of Search ................................. 260/37 EP

[56] References Cited

U.S. PATENT DOCUMENTS 3,533,985  10/1970  Lantz et al. .................... 260/37 EP
3,923,571  12/1975  Aoki et al. .................. 260/37 EP X Primary Examiner—Lewis T. Jacobs
Attorney, Agent, or Firm—Vinson & Elkins

[57] ABSTRACT

An epoxy composition including an epoxy resin, an aromatic amine which is used in an amount which is substantially the stoichiometric amount sufficient to react with the epoxy groups of the epoxy resin, a clay filler, and a material provided to extend the shelf life the composition which material has a composition as follows:

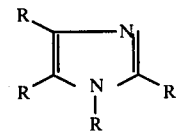

and wherein R may be hydrogen or an organic radical and preferably where said material is selected from a group consisting of imidazole, 1-methyl imidazole, 2-ethyl imidazole, 1-vinyl imidazole, and 2-ethyl 4-methyl imidazole with such material being in the range of from 0.2% to 12% by weight of the clay filler or in the range from 0.06% to 3.30% by weight of the total composition.

7 Claims, No Drawings

EPOXY COMPOSITION AND ARTICLE OF MANUFACTURE THEREOF

BACKGROUND OF THE INVENTION

Epoxy resins have the ability to remain liquid for long periods of time and then be converted upon addition of hardening agents to produce products such as glass reinforced pipe and molded fittings. This hardening is obtained by the addition of active curing or hardening agents. Two general types of reactions are involved in producing end products, that is, cross linking and catalytic polymerization through the epoxy group.

In applications involving premix, the ability to score mixtures of the epoxy resins and curing agents for extended periods of time and then cure the mixture at elevated temperatures to produce products having good chemical and physical properties is desirable. Conventional epoxy curing agents have disadvantages that limit their industrial use. For example, the Lewis acids, such as boron trifluoride monoethanol amine complex, react catalytically with epoxy resins and impart excellent latency to the formulation. However, molded parts cured with this material generally have lower corrosion resistance and less physical toughness than products cured with the preferred amine curing agents.

Aliphatic amines set up rapidly, necessitating mixing the components just before use and rapid utilization of the material before hardening. The time requirements make it economically unfeasible to prepare and mold epoxy resin premix formulations in which an aliphatic amine is employed as the hardener.

Aromatic amines cure exposy resins at elevated temperatures to tough chemically resistant products. With respect to latency, aromatic amines are between Lewis acids and aliphatic amines. When aromatic amines are employed to cure epoxy resins, heat is required to obtain useful finished products. However, when aromatic amines are employed in curing epoxy resins, semi-thermal plastic or B-staged resins are rapidly formed during the early stages of the cure, that is, before the molecules are all cross-linked. This reaction occurs rapidly even at ambient temperatures. The resins become hard and brittle and thereafter little time is available in which to work with the resins before they set up. It is desirable, therefore, to have a form-ulation which results in tough chemically resistant products yet would have a long pot life, i.e., B-stages very slowly, allowing greater working time in regard to handling of the resin. Such long pot life is very important in applications in which a premix of the resin and other materials such as fibrous reinforcing materials is utilized.

It is known that imidizoles are relatively fast curing agents for epoxy resins. Such materials lack stability in mixutres with epoxy resins at room temperature for long periods of time and thus are usually not suitable as curing agents in formulations requiring extended pot life. Some imidazoles have been used to accelerate the reaction between epoxy resins and aromatic amines. Such imidazoles, their salts, and their uses with respect to epoxys are set forth in U.S. Pat. Nos. 3,533,985; 3,553,166; 3,493,630; 3,755,253; 3,409,592; 3,746,686 and 3,642,698.

SUMMARY

The present invention relates to an improved epoxy composition which utilizes aromatic amines and a clay filler which has a relatively extended shelf life or pot life which is extended by the addition of certain materials having a composition as follows:

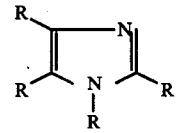

Wherein R may be hydrogen or an organic radical. Certain preferred materials are: imidazole, 1-methyl imidazole, 2-ethyl imidazole, 1-vinyl imidazole and 2-ethyl 4-methyl imidazole.

An object of the present invention is to provide an improved epoxy composition which includes a clay filler and an aromatic amine curing agent having a substantially improved shelf life whereby the epoxy, amine and clay may be mixed and held without going into B-stage condition or cured condition for a sufficient period of time, for example from 5 to 7 hours, to allow the material to be molded into a finished article of manufacture.

A further object of the present invention is to provide an improved epoxy composition wherein a critical amount of an previously reported accelerator may be added to extend the shelf life of such composition.

A further object of the present invention is to provide an improved article of manufacture utilizing the improved epoxy composition.

DESCRIPTION OF THE PREFERRED EMBODIMENTS

The improved epoxy composition of the present invention includes the epoxy resin which is provided with an aromatic amine in an amount which is substantially a stoichiometric amount to react with the epoxy groups of the epoxy resin, a clay filler and a material having a composition as follows:

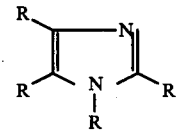

Wherein R may be hydrogen or an organic radical. In the preferred composition the material added to the epoxy, aromatic amine, and clay filler is preferred to be imidazole, 1-methyl imidazole, 2-ethyl imidazole, 1-vinyl imidazole, or 2-ethyl 4-methyl imidazole.

Since the imidazoles have commonly been used as accelerators in conjunction with the aromatic amine curing agents it was believed that the addition of such material to an epoxyaromatic amine composition would accelerate the reaction. However, considerable experimentation has shown that when a clay filler is present in this situation such material does not accelerate but functions as a retarder to give a very substantially improved shelf life.

A test was conducted wherein various components were mixed to form a homogenous mixture and such mixture was then placed in a test tube with a thermocouple inserted into the mixture and the test tube was placed into an oil bath having a temperature of approximately 190° F. Time was recorded which each composition took to reach its peak exotherm and such times together with the particular compositions in parts by weight are set forth in Table I. The aromatic amine used in these tests was the proprietary mixture marketed by Shell Chemical Company under the trademark EPON Y. The epoxy resin tested was the product marketed by Shell Chemical Company under the trademard EPON 828.

TABLE I

|  | 1 | 2 | 3 | 4 | 5 | 6 | 7 | 8 | 9 | 10 | 11 |
|---|---|---|---|---|---|---|---|---|---|---|---|
| Epoxy Resin | 100 | 100 | 100 | 100 | 100 | 100 | 100 | 100 | 100 | 100 | 100 |
| Aromatic Amine | 25 | 25 | 25 | 25 | 25 | 25 | 25 | 25 | 25 | 25 | 25 |
| Clay Filler | — | — | 50 | 50 | 50 | 50 | 50 | 50 | 50 | 50 | 50 |
| 1-Methyl-Imidazole | — | .5 | 0 | .1 | .3 | .5 | 1 | 2 | 3 | 5 | 6 |
| Minutes to reach Peak Exotherm | 28.1 | 24.4 | 6.2 | 9.2 | 16.5 | 22.5 | 20.7 | 16.0 | 12.7 | 10.1 | 9.5 |

From this it can be seen that the normal curing time of sample No. 1 would be represented by the 28.1 minutes. Such curing time would be substantially extended at normal ambient or room temperatures. It should be noted that in sample No. 2 no clay filler was used but the 1-methyl imidazole was used and it clearly functioned as an accelerator to reduce the shelf life of the composition.

As can be seen from sample No. 3, the addition of the clay filler greatly accelerates the cure time of the composition. Such composition would normally be expected to have a useable shelf life of approximately 1½ to 3 hours at ambient temperatures. The remainder of the tests clearly indicate the very substantial increase in shelf life occasioned by the use of the 1-methyl-imidazole which functioned as a retarding agent in such tests. It should be noted however that the data indicates that with sample No. 7 wherein one part by weight of the 1-methyl-imidazole was used a reduction in the time was noted over the time for sample No. 6. Continued addition of the 1-methyl imidazole in samples Nos. 8, 9, 10 and 11 indicates that a reduction in the shelf life is experienced by the addition of too much of the composition. However, it is believed that even sample No. 11 would be a very substantial improvement over the shelf life of the composition without the 1-methyl imidazole, such as shown in sample No. 3. Samples No. 4 and No. 11 are clearly approximately 50% improvement in shelf life over that shown for sample No. 3.

From these tests it can be seen that the amount of 1-methyl imidazole used should be in the range of 0.06% to 3.30% by weight of the total composition or 0.2% to 12% by weight of the clay filler.

Other components of the imidazole family have been tested. The formulations were as shown in Table II and the improvement in shelf life as compared to the composition without the use of such imidazoles is clearly illustrated by the minutes to reach peak exotherm in Table II.

TABLE II

| Epoxy Resin | 100 | 100 | 100 | 100 | 100 |
|---|---|---|---|---|---|
| Aromatic Amine | 25 | 25 | 25 | 25 | 25 |
| Clay Filler | 50 | 50 | 50 | 50 | 50 |
| Imidazole | — | 1 | — | — | — |
| 2-Ethyl Imidazole | — | — | 1 | — | — |
| 1-Vinyl Imidazole | — | — | — | 1 | — |
| 2-Ethyl 4-Methyl Imidazole | — | — | — | — | 1 |
| Minutes to reach Peak Exotherm | 6.2 | 21 | 13.7 | 16 | 17 |

Further evidence of the usefulness of the composition of this present invention were established in tests wherein the aromatic amines of different types were used. Table III set forth below indicates two different types of aromatic amines including MDA, which is methylene dianiline, and MPDA, which is m-phenylene diamine.

TABLE III

| Epoxy Resin | 100 | 100 | 100 | 100 |
|---|---|---|---|---|
| Clay Filler | 50 | 50 | 50 | 50 |
| 1-Methyl-Imidazole | — | 0.5 | — | 0.5 |
| MDA | 28 | 28 | — | — |
| MPDA | — | — | 27 | 27 |
| Minutes to reach Peak Exotherm | 9.7 | 19.3 | 6.9 | 12 |

As can be seen in both cases the use of the small amount of 1-methyl imidazole greatly extends the time to reach peak exotherm and therefore the useful shelf life.

Further testing was done to show the effect of the use of the 1-methyl imidazole with compositions having various amounts of the clay filler. In each sample shown in Table IV the same tests were run. It was noted that at very high clay filler compositions such as shown in sample Nos. 1 and 2 the addition of the 1-methyl imidazole retarding agent has very little effect. It is believed that there is an appreciable effect except that such mixtures in laboratory scale are very difficult to become completely mixed. It is apparent however from the remainder of the tests that the retarding agent has an appreciable effect. It is noted however that in comparison of samples 13 and 14 there appears to have been an excess amount of the retarding agent used which functioned as an accelerating agent to reduce the useable shelf life. This clearly indicates that the amount of the retarding agent to be used should be controlled within narrow limits. It is believed that such limits can be related to the amount of clay filler and it is preferred that such agent be used in the range from 0.2% to 12% by weight of clay filler used. Further tests on the use of additional and lesser amounts of the material in relation to the clay filler are set forth in Table IV below.

TABLE IV

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Epoxy Resin | 100 | 100 | 100 | 100 | 100 | 100 | 100 | 100 | 100 | 100 | 100 | 100 | 100 | 100 |
| Aromatic Amine | 25 | 25 | 25 | 25 | 25 | 25 | 25 | 25 | 25 | 25 | 25 | 25 | 25 | 25 |
| Clay Filler | 100 | 100 | 75 | 75 | 50 | 50 | 25 | 25 | 15 | 15 | 10 | 10 | 5 | 5 |
| 1-Methyl Imidazole | — | .5 | — | .5 | — | .5 | — | .5 | — | .5 | — | .5 | — | .5 |
| Minutes to Reach Peak |  |  |  |  |  |  |  |  |  |  |  |  |  |  |

TABLE IV-continued

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Exotherm | 6.2 | 7 | 7.6 | 13 | 9 | 21.1 | 13 | 26.5 | 18.2 | 26 | 23.3 | 26 | 26.5 | 25.2 |

A preferred composition of the present invention would be the following:

100 parts by weight — Epoxy Resin
24 parts by weight — Aromatic Amine
75 parts by weight — Clay Filler
0.5 parts by weight — 1-Methyl-Imidazole With such improved epoxy composition articles of manufacture such as glass reinforced pipe and molded fittings may be used by the addition of a chopped strained grass or suitable other fibrous reinforcing material to the composition while the composition still has the useful shelf life and the subsequent peak curing of such material in to the final article of manufacture.

From the foregoing it can be seen that the improved epoxy composition of the present invention results from the addition of an accelerator to slow down or retard the reaction of the epoxy resin and the aromatic amine curing agent. This improvement results when clay filler is used. In other composition the retarding agent of the present invention functions to shorten shelf life rather than to extend it.

What I claim is:
1. An epoxy composition which comprises,
an epoxy resin,
an aromatic amine and substantially the stoichiometric amounts sufficient to react with the epoxy groups in said epoxy resin,
a clay filler, and
a retarding agent having a composition as follows:

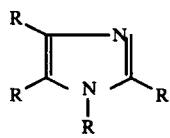

wherein R may be hydrogen or an organic radical,
said retarding agent being provided in an amount in the range from 0.06% to 3.30% by weight of the total composition and in the range from 0.2% to 12% by weight of the clay filler.
2. An epoxy composition according to claim 1 wherein said material is selected from the group consisting of imidazole, 1-methyl imidazole, 2-ethyl imidazole, 1-vinyl imidazole, and 2-ethyl 4-methyl imidazole.
3. A composition according in claim 1 including a fibrous reinforcing material added to said composition.
4. An epoxy composition which comprises
an epoxy resin,
an aromatic amine in substantially the stoichiometric amount sufficient to react with the epoxy groups in said epoxy resin,
a clay filler, and
a retarding agent selected from the group consisting of imidazole, 1-methyl imidazole, 2-ethyl imidazole, 1-vinyl imidizole, and 2-ethyl 4-methyl imidazole,
said retarding agent being provided in an amount in the range of f0.3% to 12% by weight of the clay filler.
5. An epoxy composition comprising
100 parts by weight-epoxy resin,
substantially the stoichiometric weight of aromatic amine to react with the epoxy groups of said epoxy resin,
75 parts by weight-clay filler, and
0.5 parts by weight-1-methyl-imidazole.
6. An article of manufacture comprising
a structure of heat cured material having the composition as set forth in claim 1.
7. An article of manufacture produced by curing an epoxy material having the following composition
an epoxy resin,
an aromatic amine in substantially stoichiometric amounts sufficient to react with the epoxy groups in an epoxy resin,
a clay filler,
a retarding agent selected from the group consisting of imidazole, 1-methyl imidazole, 2-ethyl imidazole, 1-vinyl imidizole, and 2 ethyl imidizole 4 methyl imidazole, and
a fibrous reinforcing material,
said retarding agent being provided in an amount in the range of 0.2% to 12% by weight of the clay filler.

* * * * *

UNITED STATES PATENT OFFICE
CERTIFICATE OF CORRECTION

Patent No. 4,041,007　　　　　　　　Dated August 9, 1977

Inventor(s) William D. Waters

It is certified that error appears in the above-identified patent and that said Letters Patent are hereby corrected as shown below:

Column 1, line 14, delete "score" and insert -- store --.

Column 1, line 47, delete "form-ulation" and insert -- formulation --.

Column 1, line 54, delete "imidizoles" and insert -- imidazoles --.

Column 1, line 62, delete "epoxys" and insert -- epoxies --

Column 2, line 26, after "of" change "an" to -- a --.

Column 2, line 56, change "epoxyaromatic" to -- epoxy aromatic --.

Column 3, line 6, change "trademard" to -- trademark --.

Column 3, lines 39-40, change "composition" to -- imidazole --.

UNITED STATES PATENT OFFICE
CERTIFICATE OF CORRECTION

Patent No. 4,041,007　　　　　Dated August 9, 1977

Inventor(s) William D. Waters

It is certified that error appears in the above-identified patent and that said Letters Patent are hereby corrected as shown below:

Column 4, line 57, after "weight" insert -- of the weight --.

Column 5, line 15, change "used" to -- made --.

Column 5, line 16, change "strained grass" to -- strand glass --.

Column 5, line 19, change "in to" to -- into --.

Column 5, line 25, change "composition" to -- compositions --.

Column 6, line 6, change "material" to --retarding agent --.

Column 6, line 9, change "in" to -- to --.

Column 6, line 22 change "f0.3%" to -- 0.2% --.

Column 6, line 35, after "composition" insert -- : --.

UNITED STATES PATENT OFFICE
CERTIFICATE OF CORRECTION

Patent No. 4,041,007　　　　　　　　Dated August 9, 1977

Inventor(s) William D. Waters

It is certified that error appears in the above-identified patent and that said Letters Patent are hereby corrected as shown below:

Column 6, line 43, change "imidizole" (both places) to -- imidazole --; same line, change "2 ethyl" to -- 2-ethyl --; same line, change "4 methyl" to -- 4-methyl --.

Signed and Sealed this

Twenty-seventh Day of December 1977

[SEAL]

Attest:

RUTH C. MASON　　　　　　　　LUTRELLE F. PARKER
*Attesting Officer*　　　　　*Acting Commissioner of Patents and Trademarks*